(12) United States Patent
Vogt et al.

(10) Patent No.: US 6,599,849 B1
(45) Date of Patent: Jul. 29, 2003

(54) KNITTED FABRIC-ELASTOMER COMPOSITE PREFERABLE FOR TRANSFER OR FILM-COATING

(75) Inventors: Kirkland W. Vogt, Simpsonville, SC (US); Howell B. Eleazer, Moore, SC (US)

(73) Assignee: Milliken & Company, Spartanburg, SC (US)

( * ) Notice: Subject to any disclaimer, the term of this patent is extended or adjusted under 35 U.S.C. 154(b) by 103 days.

(21) Appl. No.: 09/602,287

(22) Filed: Jun. 23, 2000

(51) Int. Cl.$^7$ .............................. B32B 5/02; C08J 9/30
(52) U.S. Cl. ........................ 442/104; 521/65; 521/72
(58) Field of Search ........................... 442/104, 312; 525/454, 282, 591, 773, 839; 528/80, 84; 521/65, 67, 68, 72

(56) References Cited

U.S. PATENT DOCUMENTS

| | | |
|---|---|---|
| 3,100,721 A | 8/1963 | Holden |
| 3,208,875 A | 9/1965 | Holden |
| 3,228,786 A | 1/1966 | Fitzgerald et al. |
| 3,412,054 A | 11/1968 | Milligan et al. |
| 3,480,592 A | 11/1969 | Dieterich et al. ........... 260/77.5 |
| 3,565,844 A | 2/1971 | Grace et al. ............... 260/29.2 |
| 3,695,924 A | 10/1972 | Wagner ....................... 117/76 |
| 3,705,226 A | 12/1972 | Okamoto et al. ........... 264/162 |
| 3,969,551 A | 7/1976 | Ellsworth ................... 427/282 |
| 3,989,870 A | 11/1976 | Bocks et al. ................ 428/315 |
| 4,035,213 A | 7/1977 | Thoma et al. .............. 156/231 |
| 4,046,729 A | 9/1977 | Scriven et al. ............. 260/29.2 |
| 4,053,546 A | 10/1977 | Yamasaki et al. ............. 264/49 |
| 4,094,847 A | 6/1978 | Huffman et al. ........... 260/29.4 |
| 4,137,209 A | 1/1979 | Wong et al. ................ 260/29.6 |
| 4,171,391 A | 10/1979 | Parker ........................ 427/246 |
| 4,203,883 A | 5/1980 | Hangauer, Jr. ............. 260/29.2 |
| 4,233,359 A | 11/1980 | Mimura et al. ............. 428/254 |
| 4,277,380 A | 7/1981 | Williams et al. ........ 260/18 TN |
| 4,299,868 A | 11/1981 | Berndt et al. ............. 427/389.9 |
| 4,332,710 A | 6/1982 | McCartney ................. 524/591 |
| 4,336,300 A | 6/1982 | Lorant et al. ............. 428/316.6 |
| 4,420,507 A | 12/1983 | Marco ........................ 427/170 |
| 4,452,834 A | 6/1984 | Nachtkamp et al. ........ 427/379 |
| 4,632,960 A | 12/1986 | Sato et al. .................. 525/117 |
| 4,657,957 A | 4/1987 | Baumann et al. ........... 524/245 |
| 4,833,173 A | 5/1989 | Spek et al. .................... 521/72 |
| 4,842,926 A | 6/1989 | Sawa et al. ................. 428/224 |
| 4,886,702 A | 12/1989 | Spek et al. ............... 428/308.4 |
| 5,156,900 A | 10/1992 | Nishimura .................. 428/151 |
| 5,183,695 A | 2/1993 | Masuhra et al. ............ 428/151 |
| 5,277,969 A | 1/1994 | Borri et al. ................. 428/252 |
| 5,518,800 A | 5/1996 | Okawa et al. .............. 428/151 |
| 5,876,466 A | 3/1999 | Nakashima et al. ........... 8/442 |
| 5,916,636 A | 6/1999 | Vogt ....................... 427/389.9 |
| 5,922,445 A | * 7/1999 | Yoshida et al. ........... 428/297.4 |
| 6,103,047 A | * 8/2000 | Ogawa ........................ 156/245 |

FOREIGN PATENT DOCUMENTS

GB      2093051      8/1982

\* cited by examiner

*Primary Examiner*—Cheryl A. Juska
*Assistant Examiner*—Jenna-Leigh Befumo
(74) *Attorney, Agent, or Firm*—Terry T. Moyer; Charlotte C. Wilson

(57) ABSTRACT

The present invention relates to a process for producing a knitted textile material that, when transfer or film-coated, is suitable for use as an artificial leather substrate. The inventive procedure involves (a) producing an elastomer composition of at least four ingredients (an anionically-stabilized waterborne polymer dispersion, an acid-generating chemical, a cloud-point surfactant, and a foam-stabilizing surfactant); (b) incorporating sufficient gas into the liquid mixture to generate a spreadable foam; (c) applying the foam onto a porous knitted textile substrate; (d) heating said foamed fabric until the elastomer coagulates over the fabric substrate; and (e) drying the resultant composite without destroying the coagulated structure. The resultant composite obtains a pliability, compressibility, and drape that is similar to that of leather and a surface that is suitable for transfer or film-coating to produce artificial leather. The composite may be utilized as upholstery fabric in furniture or in automobiles, apparel, and the like.

1 Claim, No Drawings

KNITTED FABRIC-ELASTOMER COMPOSITE PREFERABLE FOR TRANSFER OR FILM-COATING

TECHNICAL FIELD

The present invention relates to a knitted textile that is foamed with an elastomeric latex composition to create a textile-elastomer composite, the composite being particularly preferable for transfer or film-coating to create an artificial leather substrate. In particular, the knitted textile-elastomer composite exhibits improved compressibility, pliability, and drape, characteristics that are commonly associated with high quality leather.

DISCUSSION OF THE PRIOR ART

Polymer latexes (e.g., polyurethane and acrylate) have been utilized in a variety of ways, most notably as coatings or finishes on fabric surfaces. Such latexes may provide, for example, a barrier to potentially adverse environmental conditions. Furthermore, leather substitutes have also been produced through the use of waterborne polymer latexes. Such substitutes provide an alternative to more expensive, genuine leather articles. Such artificial leather substrates must exhibit the suppleness and appearance that are characteristic of genuine leather, and must withstand heavy and repeated use within automobile and furniture upholstery, for example.

Previous polyurethane-based leather substitute products include composites produced through the reaction of a polyurethane latex and an acid-generating chemical (specifically, hydrofluorosilicic salts). Such a composition is disclosed in U.S. Pat. No. 4,332,710, to McCartney, entirely incorporated herein by reference. McCartney teaches heat-activated coagulation of a polyurethane latex in conjunction with only an acid-generating chemical, such as salts of hydrofluorosilicic acid. Such a composition and method present some difficulties, primarily in the use of an acid-generating chemical alone to provide ionic coagulation. This two-component system often results in a non-uniform distribution in the textile substrate and can form stringy structures, which are unattractive as suede leather substitutes. Of particular concern are the environmental and safety issues associated with the use of hydrofluorosilicic acid salts, which are highly discouraged within the industry but which are patentee's preferred acid-generating chemicals.

Other prior teachings involving polymer latex heat-activated coagulation include U.S. Pat. No. 4,886,702 to Spek et al. The '702 patent discloses a method utilizing a composition comprising a waterborne polymer latex (including polyurethane and acrylate), a cloud-point surfactant coagulant, and a blowing agent, which evolves gas during heating. However, such a composition does not produce preferable leather-like textile products due to the stiff hand that results from the effect of the blowing agent. Second, the preferred blowing agent is freon, which is being phased out of production due to its deleterious environmental impact. Third, the coagulation process requires the addition of acid and/or salt compounds, which have the potential to coagulate the latex mixture prior to contact with a textile substrate, thus resulting in a non-uniform dispersion on the substrate surface. Last, the shelf-life of patentees' composition is, at a maximum, only eight hours in duration, thereby placing certain limitations on manufacturing flexibility.

Furthermore, U.S. Pat. No. 4,171,391, to Parker, teaches polyurethane latex coagulation within an aqueous ionic or acid bath. Because the determining factors are the type and amount of ionic material (or acid) and the rate of diffusion of such a constituent from the bath to the substrate material, such a procedure is difficult to control. As a result, there is a lack of consistent uniform dispersion and coagulation from one textile substrate to another. Particularly with heavier fabric substrates, the necessary contact times may be as long as 30 minutes, translating into high costs for the manufacturer and, ultimately, the consumer.

These shortcomings indicate a need, then, within the industry, for improved leather-like textile-elastomer composites, which are relatively inexpensive to make, which have a more realistic appearance and improved aesthetic qualities when transfer or film-coated, and which have an overall better performance over the prior art.

SUMMARY

This invention concerns a leather-like textile-elastomer composite, and a method of producing this composite, the method comprising the sequential steps of:

(a) providing a knitted textile fabric;
(b) foam-coating the knitted fabric with a liquid elastomer composition, the elastomer composition comprising:
  (i) a waterborne, anionically-stabilized polymer latex;
  (ii) an acid-generating chemical;
  (iii) a cloud-point surfactant; and
  (iv) a foam-stabilizing surfactant,
    wherein sufficient gas is incorporated into the liquid elastomer composition to produce a foamed elastomer composition;
(c) heating the coated textile to an initial temperature to effectuate a uniform dispersion and cause coagulation of said elastomer composition over the textile fabric; and
(d) subsequently heating the coagulated fabric to a temperature higher than the temperature utilized in step (d) in order to dry, but not destroy, the coagulated elastomer over the fabric.

The addition of step (e), in which the textile-elastomer composite is subsequently transfer or film-coated, results in a high quality artificial leather substrate that exhibits the compressibility, pliability, and drape that are characteristic of genuine leather articles.

It is thus an object of the invention to provide an improved, more aesthetically pleasing leather-like fabric-elastomer composite. The term fabric-elastomer composite refers to an article comprised of a knitted textile fabric, which has been coated on at least one side with an elastomer composition. An object of the invention is to provide a composite that has a more realistic, leather-like appearance and is more aesthetically pleasing when transfer or film-coated. Another object of the invention is to provide a method of producing a leather-like article which includes environmentally safe, nontoxic, low odor, noncombustible chemicals. Yet another object of this invention is to provide leather-like composites, which when transfer or film-coated, are suitable for all intended uses in which a user requires or desires a faux-leather substrate.

Perhaps most importantly, the inventive method and composition impart a soft, fine-structured coagulum leather-like finish to fabrics which is comparable to, if not better than, leather-like finishes produced with organic solvent-borne systems (such as those described in U.S. Pat. No. 4,886,702, noted above). Thus, the inventive method and composition provide the means to produce, in a very safe manner, a fabric-elastomer composite having a desirable suppleness and appearance, which, when transfer or film-coated, effectively simulates a genuine leather article.

The term fabric-elastomer composite refers to an article comprised of two layers, wherein one layer is a knitted textile fabric, and the second layer is an elastomeric coating that has been applied to at least one side of the knitted fabric. The second, elastomeric layer is partially incorporated into the knitted textile, creating a seamless transition between the two layers. As noted above, the inventive foamed elastomer composition comprises five materials: a waterborne polyurethane latex, an acid-generating chemical, a cloud-point surfactant, a foam-stabilizing surfactant, and sufficient gas to produce the foamed product.

An anionically stabilized polymer latex is an emulsion or dispersion formed from a polymer, an anionic surfactant, and water. Polyurethane, acrylic, or polyurethane-acrylic latex is preferable, but any waterborne anionically stabilized polymer latex may be used. The preferred latexes are those having at least a 30% solids content. One preferred example of a polyurethane latex is EX-62-655 (40% solids), available from Stahl. A suitable polyurethane-acrylic latex is Paranol T-6330 (50% solids), available from Parachem. Examples of suitable anionic surfactants for use in the polymer dispersion include, but are not limited to, poly-acrylic acid copolymers, sodium laurel sulfate, aryl or alkyl benzene sulfonates, such as, but not limited to, the proprietary Rhodacal DS-10 (from Rhodia). In addition to the anionic surfactant and water, a nonionic surfactant may also be included in the polymer dispersion. Examples of a nonionic surfactant include polyvinyl alcohol and ethoxylated surfactants, such as Pluronic F-68 (from BASF). Also well known in the art is the incorporation of carboxyl or sulfate groups into the backbone of the polymer in order to help stabilize the latex. The waterborne criterion is of utmost importance within this invention primarily to insure that potentially environmentally harmful organic solvents are not present within the elastomer composition.

The term acid-generating compound denotes a chemical which is not an acid at room temperature, but which produces an acid upon exposure to a heat source. Examples include, but are not limited to, ammonium acid salts like ammonium sulfate and ammonium phosphate, and organic acid esters. One particularly suitable class of compounds that both meet this description and that provide superior results with little or no harmful environmental impact are organic acid esters. Some specific types of these compounds include ethylene glycol diacetate, ethylene glycol formate, diethylene glycol formate, triethyl citrate, monostearyl citrate, a proprietary organic acid ester available from High Point Chemical Corporation under the tradename Hipochem AG-45, and the like. The most preferred compound is ethylene glycol diacetate, available from Applied Textile Technologies under the tradename APTEX™ Donor H-plus.

The term cloud-point surfactant is intended to encompass any surface-active agent that becomes less water soluble upon exposure to higher temperatures. This type of surfactant easily binds with the polymer latex upon gelling and facilitates the uniform coagulation of the latex over the entire contacted textile substrate. Specific surfactants that meet such requirements include poly(ethylene) oxides, poly (ethylene/propylene) oxides, polythio ethers, polyacetals, polyvinylalkyl ethers, organo-polysiloxanes, polyalkoxylated amines, or any derivatives of these listed compounds, with the preferred being polyalkoxylated amines, available from Clariant under the tradename Cartafix U™.

The term foam-stabilizing surfactant includes any surface-active agent that improves the ability of the inventive composition to entrain, and retain, air. Particular examples include, but are not limited to, alkyl benzene sulfates and sulfonates (Rexoprene series from Emkay Chemical) like sodium laurel sulfate (also sold under the name Stephanol AM from Stepan Corporation), sodium dioctyl sulfosuccinate, dodecyl benzene sulfonate, alkyl amine oxides (Unifroth series from Unichem Corp.), alkyl phosphates (Synfac series from Milliken Chemical), ammonium stearate (Henkel), water-soluble cellulose derivatives (Hercules Inc.), and Alkasurf DAP-9 (Rhodia).

The proportions required within the inventive elastomer composition are based upon the ratio of weights between the latex and each of the remaining components. For instance, ratios between the latex and each of the other components (namely, the acid-generating compound, the cloud-point surfactant, and the foam-stabilizing surfactant) should be in the range of 5:1 to 200:1, with preferred ranges of from about 10:1 to about 50:1. The Examples below further illustrate the utilization of such ranges of weight ratios.

The gas associated with the foam production is selected from the group consisting of atmospheric air, mixtures of oxygen, nitrogen, and hydrogen, and the like. Atmospheric air is preferred as an inexpensive and readily available source. The gas is incorporated at a pressure in the range of 1 pound per square inch (gauge) to 100 pounds per square inch (gauge), with a preferred range of about 25 p.s.i.g. to about 50 p.s.i.g. The acceptable weight ratio of air to latex within the composition is in the range of 0.1:1 to 50:1, with a preferred range of 3:1 to 8:1.

The air, or other gas, is incorporated into the foam by mechanical agitation. The air-incorporation process, commonly called foaming, may be accomplished through any accepted procedure. Examples, not intended as limitations, include whipping with a Hobart mixer or a Gaston Systems mechanical foamer. The foamed elastomer composition can then be applied with screen coating, knife coating, parabolic foam coating, and the like, without any limitation intended.

It has been found that incorporating air into (or foaming) the inventive composition offers several benefits over conventional application methods. First, the amount of elastomer applied to the textile substrate is less than the amount that would be used in a dip application, thus resulting in cost savings to manufacture. Secondly, because the incorporated air reduces the density of the inventive composition, the substrates that are produced following coagulation have aesthetic properties that more closely resemble leather. In addition, the air incorporated into the foam increases the volume of the coating, improving application and creating an improved surface for transfer coating. Finally, the manufacturer has greater control over the application of the elastomer. As a result, the foam mixture does not have to be applied to both sides of the fabric, as it would be with a dip application. Further, the degree of penetration of the foam into the textile substrate can also be controlled.

Subsequently, the elastomer-coated textile fabric is heated. This heating step generates an acid and gels the cloud-point surfactant, which then uniformly coagulates the inventive latex over the entire substrate. The temperature required to initiate the reaction depends on the particular acid-generating compound utilized. However, in general, the requisite temperature should be at least 80° C., with a high temperature being about 130° C.

The boiling point of water is the preferred temperature, particularly where a steam application (and most preferably a saturated steam application of 100° C. to 110° C. at sea level) is used. Such conditions are preferred because moist heat (steam) provides the most effective exposure for the elastomer composition. The presence of moisture permits a greater level of control over the reaction since the addition of dry heat generally vaporizes the aqueous portion of the inventive latex, which promotes the undesirable formation of a continuous polymer film. The latex must remain moist in order for proper and uniform coagulation to ensue. Therefore, the elastomer composition preferably must contain water during the entire reaction. An exposure time of from about 1 minute to about 10 minutes, in a steam application, may be used. The preferred exposure time is about 2 minutes in a steam application. The utilization of a steam heating step again provides a distinct advantage over the prior art by retaining strictly aqueous solvent reaction conditions.

Alternatively, the coated fabric may also be exposed to rapid heating by a microwave or radio frequency heat source, which does not provide an appreciable loss of moisture to the overall elastomer composition. An exposure time of from about 1 second to about 1 minute in a microwave application may be used.

Yet another alternative is to expose the coated fabric to heating by a convection heat source. Preferably, the temperature should be raised slowly to allow the coating to coagulate prior to dry and prevent the coating from cracking. An exposure time of from about 10 seconds to about 10 minutes in a convection oven may be used.

After the first heating step, the textile-elastomer composite is dried, preferably by high convection, low temperature heating (preferably, but not limited to, less than 130° C.) or by microwave heating in order to prevent continuous film formation on the fabric surface. The second heating step is engineered to dry the composite without destroying the coagulation of the elastomer composition.

The knitted textile fabric utilized within the inventive process should be comprised of any synthetic fibers. As merely examples, and not intended as limitations, the textile fabric may be constructed from fibers of polyester, nylon (-6 or -6,6), polyolefins, polylactic acid, spandex, and the like. The preferred knit fabric is made of polyester, and most preferably polyethylene terephthalate yarns. The knitted textile can be produced using a variety of constructions, including warp knit constructions (such as raschel and tricot) and weft knit constructions (such as circular and flat knit). The most preferred construction is a tricot construction, which uses three bars to create the fabric. The most preferred yarn sizes and types for each bar are as follows: bars 1 and 2 contain a monofilament yarn having a denier equal to or less than 300 denier, and bar 3 contains a multifilament yarn having a combined denier equal to or less than 300 denier. For example only, and not as limitation, bar 3 could incorporate a two-ply yarn, in which each ply has a denier such that, when the deniers of the two plies are combined, the combined denier for the multifilament yarn is in the range of 300 denier or less. Bar 3 produces the face of the finished fabric, while bars 1 and 2 produce act as "ground" yarns on the back of the finished fabric. The preferred number of courses per inch is in the range of 60, and the preferred number of wales per inch is in the range of about 40. However, course and wale counts can range plus or minus 40% from the preferred values listed above.

The textile fabric may be treated with dyes, colorants, pigments, ultraviolet absorbers, softening agents, soil redisposition agents, lubricating agents, antioxidants, flame retardants, rheology agents, and the like, either before foaming or after, but with a preference for such additions before foaming. Within the elastomer composition, there may be incorporated any of the above-listed textile additives, as well as lubricating agents or cross-linking agents. One particularly desired agent is a softening/soil redisposition/lubricating additive Lubril QCX™, available from Rhône-Poulenc. Desirable pigments include PP14-912 and PP14-905 available from Stahl.

It has been found that sanding or napping the fabric prior to the application of the elastomeric composition will improve the hand of the fabric-elastomer composite and will improve the adhesion between the fabric and the composition. In addition, the sanding or napping process has been found to impart, in the fabric-elastomer composite, a suede-like feel on the effective back of the composite. It is believed that sanding is most preferable for knit fabrics.

In addition, in some circumstances, it may be desirable to subject the finished fabric to a calendering process. Calendering improves the adhesion characteristics of the final product (that is, the three-layer fabric-elastomer composite that has also been transfer coated). The calendering process produces a feel similar to that of suede on the effective back of the transfer-coated fabric-elastomer composite. Calendering can be achieved on any equipment designed for such purpose, including, but not limited to, a Briem calender having a heated drum width of approximately 20 inches. Because the settings for temperatures, pressures, and speeds are all related to one another, a range of appropriate settings could be used to achieve the desired effect. For example, one such preferred setting involves a temperature of 150° F., a pressure of 40 kg/cm$^2$, and a speed of 2 yards/minute.

After calendering, the fabric-elastomer composite is subjected to either transfer or film coating to create a three-layer composite structure that resembles genuine leather in both appearance and tactile characteristics. In both transfer and film coating, the additional coating is applied in contact with the elastomer coating. The technical face of the textile becomes the effective back of the three-layer composite. The transfer coating process involves the application of a plurality of individual layers of polyurethane (typically, at least two, but up to five or more) to a paper backing. The coatings are then adhered to the fabric-elastomer composite, and the paper backing is removed, resulting in a three-layer leather-like product in which the third layer refers to a plurality of individual layers that are applied together to the already produced two-layer composite. The film coating process involves adhering a sheet-like film substrate to the fabric-elastomer composite, typically using adhesives and heat to laminate the film to the composite. The term "film" is used to mean any thin, sheet-like substrate, comprising either a metallic substrate, a polymeric or plastic film, or a felt-like or flocked textile substrate.

The inventive composite may be utilized as upholstery fabric for furniture or in automobiles; within garments or apparel; or for any other purpose in which a textile leather substitute is desired.

DETAILED DESCRIPTION OF THE PREFERRED EMBODIMENTS

The preferred embodiment of the inventive composite is set forth in the following Examples.

EXAMPLE 1

A tricot knit, having 60 courses per inch and 39 wales per inch, was created using 20 denier monofilament polyester in bar 1, 20 denier monofilament polyester in bar 2, and a one-ply 100 denier, 100 filament (1/100/100) polyester yarn in bar 3. The fabric was sanded on the technical back with a 0.028 inch gap. The technical face of the fabric was then sanded with a 0.018 inch gap. The fabric was dyed using disperse dyestuffs to achieve a desired color. Subsequently, the technical back of the fabric was wetted out and then foam-coated with the elastomer composition (i.e. polyurethane) described herein. The foam coating was applied with a knife-over-slot method, off the pin coater. The speed of application was 15 yards per minute (ypm). Following the application of the elastomeric foam, the fabric passed through a tenter-oven having a series of nine temperature zones, in which the elastomeric foam was allowed to uniformly coagulate over the fabric surface without over-drying the fabric. The temperature of the zones was set as follows: Zone 1 at 250° F., Zones 2 and 3 at 275° F., Zone 4 at 300° F., Zones 5 through 8 at 350° F., and, Zone 9 at 275° F. The fan speed was set on low for Zones 1 through 5 and on high for Zones 6 through 9. The peel strength of the resulting fabric-elastomer composite was tested using a Sintech 1/S machine in accordance with ASTM Test Method D413 (Book 9.01). The test results showed a peel strength of less than 2 pounds per inch.

EXAMPLE 2

A knit sample was prepared with the same construction as that of Example 1 and in the same manner described in Example 1. The knit fabric was then subjected to a calendering process on a Briem calender with a drum having an approximately twenty-inch width. The calendering process was accomplished at a speed of 2 yards per minute, a pressure of 40 kg/cm$^2$, and a temperature of 150° F. The peel strength of the resulting calendered fabric-elastomer composite was tested using a Sintech 1/S machine in accordance with ASTM Test Method D413 (Book 9.01). The test results showed a peel strength of 6.4 pounds per inch, more than three times the peel strength of the non-calendered sample, as described in Example 1.

The Kawabata Evaluation System

A specialized, quantitative measure of pliability, compressibility, and softness—the Kawabata Evaluation System—was utilized, and shall be described below.

The Kawabata Evaluation System ("Kawabata System") was developed by Dr. Sueo Kawabata, Professor of Polymer Chemistry at Kyoto University in Japan, as a scientific means to measure, in an objective and reproducible way, the "hand" of textile fabrics. This is achieved by measuring basic mechanical properties that have been correlated with aesthetic properties relating to hand (e.g., slickness, fullness, stiffness, softness, flexibility, and crispness). The mechanical properties that have been associated with these aesthetic properties can be grouped into five basic categories for purposes of Kawabata analysis: bending properties, surface properties (friction and roughness), compression properties, shearing properties, and tensile properties. Each of these categories is comprised of a group of related mechanical properties that can be separately measured.

The Kawabata System uses a set of four highly specialized, custom-developed measuring devices. These devices are as follows:

Kawabata Tensile and Shear Tester (KES FB1)
Kawabata Pure Bending Tester (KES FB2)
Kawabata Compression Tester (KES FB3)
Kawabata Surface Tester (KES FB4) KES FB1 through 3 are manufactured by the Kato Iron Works Co., Ltd., Div. of Instrumentation, Kyoto, Japan. KES FB4 (Kawabata Surface Tester) is manufactured by the Kato Tekko Co., Ltd., Div. of Instrumentation, Kyoto, Japan. The results reported herein required only the use of KES FB1, KES FB2 and KES FB4.

For the testing relating to the characteristics of compressibility, pliability, and drape described herein, only Kawabata System parameters relating to the properties of compression, bending, and shearing stiffness were used.

The complete Kawabata Evaluation System is installed and is available for fabric evaluations at several locations throughout the world, including the following institutions in the U.S.A.:

North Carolina State University
College of Textiles
Dep't. of Textile Engineering Chemistry and Science
Centennial Campus
Raleigh, N.C. 27695
Georgia Institute of Technology
School of Textile and Fiber Engineering
Atlanta, Ga. 30332
The Philadelphia College of Textiles and Science
School of Textiles and Materials Science
Schoolhouse Lane and Henry Avenue
Philadelphia, Pa. 19144

Additional sites world-wide include The Textile Technology Center (Sainte-Hyacinthe, QC, Canada); The Swedish Institute for Fiber and Polyrher Research (Molndal, Sweden); and the University of Manchester Institute of Science and Technology (Manchester, England).

The Kawabata Evaluation System installed at the Textile Testing Laboratory at the Milliken. Research Corporation, Spartanburg, S.C. was used to generate the numerical values reported herein.

KAWABATA BENDING TEST PROCEDURE

A 20 cm×20 cm sample was cut from the web of fabric to be tested. Care was taken to avoid folding, wrinkling, stressing, or otherwise handling the sample in a way that would deform the sample. The die used to cut the sample was aligned with the yarns in the fabric to improve the accuracy of the measurements. The samples were allowed to reach equilibrium with ambient room conditions prior to testing unless otherwise noted.

The testing equipment was set-up according to the instructions in the Kawabata Manual. The machine was allowed to warm-up for at least 15 minutes before samples were tested. The amplifier sensitivity was calibrated and zeroed as indicated in the Manual. The sample was mounted in the Kawabata Heavy Duty Pure Bending Tester (KES FB2) so that the cloth showed some resistance but was not too tight. The fabric was tested in both the course and wale directions, and the data was automatically recorded by a data acquisition program running on a personal computer. The coefficient of bending for each sample was calculated by a personal computer-based program that merely automated the prescribed data processing specified by Kawabata, and the results were recorded with measurements taken when the samples were flexed in opposite directions.

EXAMPLE 3

Prior Art

The Heavy Bending test (KES FB2) was used to measure the force required to bend the fabric-elastomer composite approximately 150 degrees. The fabric sample was created by using the construction of Fabric 1, but rather than foaming the elastomer composition onto one side of the fabric, the fabric was dipped into the elastomer composition, nipped between nip rolls to effect penetration and pick-up control, and then dried. The dip-coated fabric-elastomer, produced as described herein, required a force of 1.9 grams force cm² per centimeter in the course (fill) direction and 1.5 gfcm²/cm in the wale (warp) direction.

EXAMPLE 4

The fabric-elastomer composite of Example 1 (having been subjected to foam coating on one side only) was tested according to the Heavy Bending Test described above. The foam-coated fabric-elastomer composite required a force of only 0.9 gfcm²/cm in the course direction and 0.9 gfcm²/cm in the wale direction. This result indicates that the foam-coated fabric-elastomer of Example 1 is softer and more pliable than the dip-coated fabric-elastomer of Example 3.

EXAMPLE 5

Prior Art

The dip-coated fabric-elastomer described in Example 3 was subjected to compression testing on the Kawabata Compression Tester (KES FB3) using the "standard measurement" technique. The gear speed of the red gear was set at 1 mm/50 seconds, the Fm speed was set at 5.0, the stroke select was set at 5 mm, the sens speed was set at 2×5, and the time lag was set at "standard." A gap distance of 2.5 was used. The compression test measures the resilience or "body" of a fabric sample, by comparing the % difference between the gauge of the non-compressed sample with the gauge of a sample under a controlled compression. The fabric-elastomer composite exhibited a compression rate of 13.7%.

EXAMPLE 6

The fabric-elastomer composite of Example 1 was subjected to compression testing on the Kawabata Compression Tester (KES FB3) using the "standard measurement" technique. The gear speed of the red gear was set at 1 mm/50 seconds, the Fm speed was set at 5.0, the stroke select was set at 5 mm, the sens speed was set at 2×5, and the time lag was set at "standard." A gap distance of 2.5 was used. The compression test measures the resilience or "body" of a fabric sample, by comparing the % difference between the gauge of the non-compressed sample with the gauge of a sample under a controlled compression. The fabric-elastomer composite exhibited a compression rate of 39.6% (close to a 300% improvement as compared to the fabric-elastomer composite of Example 3).

EXAMPLE 7

Prior Art

A 200 g sample of the fabric-elastomer composite of Example 3 was subjected to the "Standard Measurement" of the Shear Test (KES FB1) on the Kawabata machine. The sens control was set at 2×5, and the elongation measurement was 25 mm. The shear control was in the "set" position, rather than the "variable" position. The Shear Test gives an indication of the stiffness and resistance a sample has when subjected to opposing parallel forces. The numerical values that are produced in this test, as measured in the warp and fill directions, increase in direct relation to the stiffness of the fabric (high value, high stiffness). The fabric-elastomer composite of Example 3 exhibited a measured stiffness of 10.5 gf/cm degree in the fill direction and a measured stiffness of 7.0 in the warp direction.

EXAMPLE 8

A 200 g sample of the fabric-elastomer composite of Example 1 was subjected to the "Standard Measurement" of the Shear Test (KES FB1) on the Kawabata machine. The sens control was set at 2×5, and the elongation measurement was 25 mm. The shear control was in the "set" position, rather than the "variable" position. The Shear Test gives an indication of the stiffness and resistance a sample has when subjected to opposing parallel forces. The numerical values that are produced in this test, as measured in the warp and fill directions, increase in direct relation to the stiffness of the fabric (high value, high stiffness). The fabric-elastomer composite of Example 4 exhibited a measured stiffness of 6.7 gfcm²/cm degree in the fill direction and a measured stiffness of 9.0 in the warp direction. This difference, particularly in the fill direction, indicates a lesser degree of stiffness (i.e., a softer composite).

What is claimed is:

1. A fabric-elastomer composite suitable for transfer-coating to produce a material having the appearance of leather, wherein said fabric-elastomer composite is comprised of a knitted textile fabric that has been coated with an elastomer composition comprising (i) a waterborne, anionically-stabilized polymer latex;

(ii) an acid-generating chemical selected from the group consisting essentially of at least one organic ester;

(iii) at least one cloud-point surfactant;

(iv) at least one foam-stabilizing surfactant; and (v) sufficient gas to produce a foam when introduced into said elastomer composition.

* * * * *